3,669,797
METHOD OF MANUFACTURING COMPOSITE BODIES OF METALS AND POLYOLEFINS
Yoshiaki Fukazawa, Yoshitaka Iwata, and Shigeharu Sakurai, Tokyo-to, Japan, assignors to Mitsubishi Kasei Kogyo Kabushiki Kaisha, Tokyo-to, Japan
Filed July 1, 1969, Ser. No. 838,204
Claims priority, application Japan, July 6, 1968, 43/47,424; June 3, 1969, 44/43,362
Int. Cl. C09j 5/04
U.S. Cl. 156—316
13 Claims

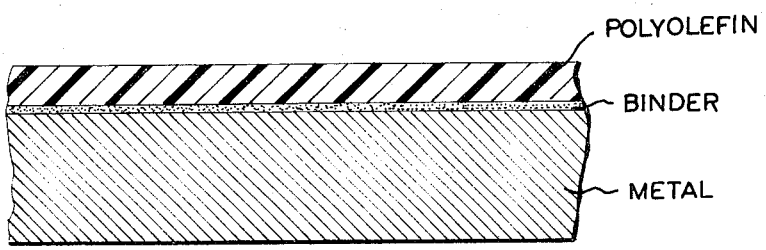

ABSTRACT OF THE DISCLOSURE

In the manufacture of composite bodies of metals and polyolefins, a binder is used essentially consisting of a member selected from the group consisting of maleic acid-vinyl acetate copolymer, acrylic acid-vinyl acetate copolymer, esterified maleic acid-vinyl acetate copolymers and esterified maleic acid-styrene copolymers and the composite bodies are pressed at a temperature higher than the melting point of polyolefins.

BACKGROUND OF THE INVENTION

This invention relates to a method of manufacturing composite bodies of metals and polyolefins, and more particularly to a method of manufacturing such composite bodies by utilizing special binders comprising copolymers.

Polyolefins such as polyethylene and polypropylene are generally very difficult to bond with metal because they do not contain any polar member, for example, a functional group and the like, in their molecules and because they are highly crystalline. Further, when metal-polyolefin composite bodies are used in such adverse circumstances as those in which they are subjected to large deformation, repeated bending stress, cyclic temperature variations and the like, peel-off is the most important problem. Thus, for example, when a sheet of the composite body is shaped with a cold press peel-off occurs unless strong bonding between metal and a polyolefin is provided, thus resulting in unsatisfactory products.

In order to solve this problem, there have been proposed various methods including a method in which the metal surface is treated physically or chemically to provide a roughened surface, and the polyolefin is bonded thereto by fusion, and methods wherein polyolefin is subjected to solvent treatment, flame treatment, hot air treatment, acid treatment, electric discharge treatment, or a hydrophilic high-molecular substance is grafted to the polyolefin or wherein special binders are used. However, composite bodies manufactured by these prior methods cannot well withstand such working procedures as cutting, bending, drilling, drawing and the like. Among the surface treatments there has been proposed a method wherein the metal is first treated with chromic acid and is then bonded to a polyolefin with maleic acid, but this acid tends to corrode the metal in such a case.

SUMMARY OF THE INVENTION

We have investigated methods of manufacturing metal-polyolefin composite bodies free from the above described defects or composite bodies in which polyolefin and metal are bonded very strongly so that they have low specific gravity, excellent mechanical characteristics, workability and shapeability similar to metals, good surface appearance, weather proofness, heat insulating property, sound intercepting property and the like, and discovered that when a special binder is used it is possible to obtain composite bodies having the various desirable characteristics mentioned above.

It is, therefore, an object of this invention to provide a novel method which can provide metal-polyolefin composite bodies having excellent properties.

This object can be accomplished by using a binder which is selected from the group consisting of maleic acid-vinyl acetate copolymer, acrylic acid-vinyl acetate copolymer, esterified maleic acid-vinyl acetate copolymers and esterified maleic acid-styrene copolymers and then pressing the bonded assembly at a temperature higher than the melting point of polyolefin.

BRIEF DESCRIPTION OF THE DRAWING

The drawing depicts a cross-section of the laminate produced by the process of this invention, the top layer being polyolefin, the middle layer being the binder and the bottom layer being metal.

To have more clear understanding of this invention, the invention will be discussed in more detail. While the invention is not limited to any type of polyolefins they are normally polyethylene, polypropylene, polybutene, etc. Of course, these polyolefins include copolymers of olefins or with other monomers. These polyolefins may be in the form of powder, pellet, sheet or any other configuration, foamed or not foamed suitable configuration being selected according to a particular type of composite body to be manufactured.

While the invention is not limited to any type of metal which is to be bonded with polyolefins, iron aluminum, copper, zinc, nickel, tin, magnesium, titanium, manganese and alloys thereof are ordinarily preferred. These metals may be used in the form of sheet, plate or block.

As the binder for bonding metals and polyolefins maleic acid-vinyl acetate copolymer, acrylic acid-vinyl acetate copolymer, esterified maleic acid-vinyl acetate copolymers or esterified maleic acid-styrene copolymers are utilized. Such copolymers and esters thereof may be prepared by any well known methods. For example, the vinyl acetate-maleic acid copolymer can be prepared by copolymerizing vinyl acetate and maleic acid (including its anhydride) according to a conventional method. To obtain an esterified compound of this copolymer, the latter is admixed with an alcohol and the mixture is then heated to cause reaction. Alternatively, esterified compounds of polymers may be prepared by first esterifiying maleic acid and then copolymerizing the ester.

In addition to the above-mentioned vinyl acetate-maleic acid series copolymers vinyl acetate-acrylic acid copolymer and the esterified styrene-maleic acid copolymers are also suitable. These copolymers can be prepared in the same manner as copolymers of the vinyl acetate-maleic acid series. Esterified copolymers may be obtained by using esterified compounds of monomers or by esterifying copolymers.

The copolymerization ratio of these copolymers varies dependent upon the type of the copolymerization components used. Thus, for example, where maleic acid is used as one of the components, its polymerization ratio is always limited to 1:1 due to the inherent property of maleic acid. Thus, in this example, also, the copolymerization ratio of copolymers of the maleic acid series is 1:1. The copolymerization ratio of copolymers of the acrylic acid series is substantially the same ratio.

Although the degree of esterification of esterified copolymers of the maleic acid series is not critical esterification after forming copolymers does not generally proceed to the state of diester but terminates at the stage of monoester which is called a half-ester. If esterification is caused to proceed to the state of diester, diester is not suitable because it tends to decrease bonding strength. On the contrary, half ester improves the water resistance property of the binder.

Alcohols utilized to effect such esterification are selected from the group of aliphatic alcohols having 1 to 8 carbon atoms, such as methyl, ethyl, butyl and octyl alcohol and aromatic alcohols such as benzyl alcohol. In addition to alcohols mentioned above, by the term "alcohol" as used herein it is intended to also cover such compounds which undergo esterification as phenol, cresol and the like.

Also, the method of esterification is not critical. Thus, for example, where a copolymer is to be esterified the copolymer is incorporated into a selected alcohol and the mixture is heated to the boiling point of the alcohol. Due to this heating, esterification reaction is promoted and the copolymer becomes dissolved when the state of half esterification is reached.

Except the esterified compounds, binders thus obtained are soluble in water so that they can be used as aqueous solutions. Esterified compounds which are not soluble in water are dissolved in suitable solvents, for example, alcohols such as methanol, ethanol, butanol, ketones such as acetone, tetrahydrofuran, and esters such as ethyl acetate, ethyl butyrate. Unesterified copolymers can also be dissolved in similar or other solvents. Too high concentration of the solution of the binder results in a too thick layer of the binder when it is applied and cracks are often formed in the thick layer to decrease the bonding strength. Consequently it is desirable to use relatively low concentration of the order of 0.1 to 10%, preferably 0.1 to 5%.

The binder may be applied either to metals or polyolefins. To ensure satisfactory application of the binder and to further improve the bonding strength it is advantageous to clean the surfaces to be bonded by any conventional method. It is also desirable to subject the metal surface to a surface treatment utilizing chromic acid, phosphoric acid, anodic oxydation etc.

In the same manner, in order to clean the surface and to improve the bonding strength it is also advantageous to subject the polyolefins to such surface treatments as solvent treatment, flame treatment, hot air treatment, acid treatment, electric discharge treatment and grafting of hydrophilic high molecular compounds.

Thereafer the binder in the form of a solution is applied to metals and/or polyolefins by any suitable methods for example, dipping, spraying coating or brushing. After applying the binder to predetermined portions the metal and polyolefin are bonded together. The temperature for bonding may be any temperature less than the decomposition temperature of the polyolefin or of the binder but higher than the melting point of the polyolefin. The term "melting point of the polyolefin" is not limited to a temperature at which the polyolefin to be bonded is wholly melted but includes a temperature at which the surface of the polyolefin in contact with the metal melts. Normally, practically used temperature ranges from 165° C. to 250° C., preferably from 180° C. to 220° C. It is also advantageous to effect bonding under pressure of more than 1 kg./cm.$^2$, preferably more than 5 kg./cm.$^2$. The time required for bonding varies dependent upon the temperature and pressure but interval of time of 10 seconds to 40 minutes, preferably 1 to 25 minutes is preferred.

Satisfactory bonding can be obtained by applying the binder to desired portions of metals or polyolefins, but the binder may be applied to both of them. The metal to be bonded is not limited to one type only. For example, sheets of different metals may be bonded to the opposite sides of a sheet of polyolefin, or a number of metal sheets and polyolefin sheets may be laminated in interleaved relationship.

The resulted metal-polyolefin composite body has extraordinary higher bonding strength than conventional composite bodies, does not decrease its bonding strength when subjected to severe mechanical workings such as cutting, drilling, bending and drawing as well as severe temperature change and has excellent weather proof and water proof properties.

The following specific examples are given by way of illustration, and are not to be construed as limiting in any way the scope and spirit of the invention.

DESCRIPTION OF THE PREFERRED EMBODIMENTS

EXAMPLE 1

An aluminum sheet, 0.2 mm. thick, was cleaned with trichloroethylene, dipped in 5% aqueous solution of chromic acid for 5 minutes and then washed with water. The aluminum sheet was then immersed in 1% (by weight) aqueous solution of vinyl acetate-maleic acid copolymer (copolymerization ratio 1:1, molecular weight 60,000) copolymerized by a conventional method, removed from the solution and air dried. The coated aluminum sheet was then placed in press mold together with an extruded polyethylene sheet with its surface cleaned with trichloroethylene and the assembly was molded for 3 minutes at a temperature of 190° C. and under a pressure of 12 kg./cm.$^2$, and then cooled rapidly to obtain an aluminum-polyethylene composite body. The 180° peel-off strength of obtained composite body measured according to ASTM, D903-49 was 9.5 kg./cm. The peel-off strength of this composite body did not decrease after 5 cycles of temperature variation from boiling water to cold water (20° C.). It also showed large resistance against repeated bending stress test.

Following Table 1 shows 180° peel-off strength of the composite body of this example, of a composite body prepared in the same manner as this example excepting the treating agent and of a control composite bodies.

TABLE 1

| Binder | | 180° peel-off [1] strength, kg./cm. | After cyclic [2] temp. variation, kg./cm. |
|---|---|---|---|
| Control test | Not used | 0.6 | |
| Example: | | | |
| 1 | Vinyl acetate-maleic acid copolymer. | 9.5 | 9.5 |
| 2 | Vinyl acetate-acrylic acid copolymer. | 7.1 | 7.1 |
| Control: | | | |
| I | Ethylene-maleic acid copolymer. | 2.0 | 1.9 |
| II | Polyacrylic acid | 1.8 | 1.8 |
| III | Polyacrylamide | 1.6 | 1.2 |
| IV | Ethylene-pyrolidone copolymer. | 1.6 | |
| V | Maleic acid | 2.9 | 2.9 |

[1] 23° C., 5% relative humidity, peel-off speed/mm./min., determined by ASTM D903-49.
[2] Peel-off strength after cyclic temperature variation between boiling water and cold water.

EXAMPLE 2

An aluminum sheet of 0.2 mm. thick was cleaned with trichloroethylene, dipped in 5% aqueous solution of chromic acid for 5 minutes and washed with water. The treated aluminum sheet was immersed in 1% aqueous solution of a maleic acid anhydride-vinyl acetate copolymer prepared by a conventional method (copolymerization ratio 1:1, molecular weight, 60,000) and then air-dried.

Surface of an extruded polyethylene sheet (sold by Mitsui Petroleum Chemical Company under the trade name of Hizex 5000H) was cleaned with trichloroethylene. A lamination of the aluminum sheet and polyethylene sheet was pressed by a press mold at a temperature of 190° C. and a pressure of 30 kg./cm.$^2$ for 3 minutes and then cooled. The 180° peel-off strength of the resulted aluminum-polyethylene composite body was 9.5 kg./cm. After subjecting the composite structure to five cycles of temperature variation of boiling water to cold water (20° C.) and to a number of bending, any decrease in the bonding strength and peel-off were not noted.

EXAMPLE 3

A polyethylene sheet identical to that used in Example 2 and flame treated by a conventional method was dipped in 1% aqueous solution of a maleic acid-vinyl acetate copolymer identical to that used in Example 1 and then air dried.

An aluminum sheet treated with chromic acid in the same manner as in Example 1 was placed in a press mold together with the polyethylene sheet coated with the binder as above described and the lamination was pressed at a temperature of 190° C. and under a pressure of 30 kg./cm.$^2$ for 3 minutes and then cooled rapidly. The 180° peel-off strength of the resulted aluminum-polyethylene composite body was 9.0 kg./cm. The decrease of bonding strength and peel-off did not occur after repeated bending and cyclic temperature variation.

EXAMPLE 4

A polyethylene sheet (sold by Mitsui Petroleum Chemical Company under the trade name of Hizex 5100B) flame treated according to a conventional method was dipped in 2% aqueous solution of an acrylic acid-vinyl acetate copolymer prepared by a conventional method. An aluminum sheet of 0.2 mm. thick was treated with chromic acid in the same manner as in Example 3 and then placed in a press mold together with the polyethylene sheet coated with the binder as above described. The lamination was pressed at a temperature of 190° C. and under a pressure of 30 kg./cm.$^2$ for 3 minutes and then cooled to obtain a composite body.

The 180° peel-off strength of the resulted composite body was 7.8 kg./cm. and decrease of the bonding strength and peel-off did not occur after repeated bending and cyclic temperature variation.

EXAMPLE 5

A corrosion proof aluminum sheet of 0.5 mm. thick (sold by Mitsubish Reynolds Aluminum Company under the trade name of 5052-34H was degreased with 10% solution of sodium hydroxide and 5-10% aqueous solution of nitric acid and then immersed in 5% aqueous solution of chromic acid.

A commercial maleic acid anhydride-vinyl acetate copolymer (polymerization ratio 1:1, molecular weight 60,000) was incorporated into octyl alcohol and the mixture was heated to the boiling temperature of the octyl alcohol to effect half esterification. The resulted octyl alcohol solution of the half esterified compound was admixed with ethyl alcohol to obtain a 1% solution. The solution was applied to predetermined portions of said surface treated aluminum sheet by dipping and the aluminium sheet was air dried.

A sheet of high density polyethylene (sold by Mitsubishi Chemical Industries Ltd. under the trade name of Novatec ET002, and having a melt index of 0.2) was laminated upon predetermined portions of said coated aluminum sheet. The lamination was then pressed in a press mold at a temperature of 200° C. and under a pressure of 15 kg./cm.$^2$ for 5 minutes.

The 180° peel-off strength of the resulted composite body was 15.8 kg./cm. while the tear strength was 250 kg./cm.$^2$. After subjecting to 50 times of cyclic temperature variation between —70° C. and 100° C., the bonding strength did not decrease. The temperature depending property of the bonding at temperatures ranging from —60° C. to 100° C. was small. The peel-off strength at 100° C. was 13.5 kg./cm. while that at —60° C. was 14.0 kg./cm.

EXAMPLE 6

An aluminum sheet treated with chromic and in the same manner as in Example 5 was dipped in a 1% tetrahydrofuran solution of halfester compound which was obtained by half-esterifying a commercial styrene-maleic acid copolymer in the same manner as in Example 5.

The treated aluminum sheet was piled upon a high density polyethylen sheet (sold by Mitsubishi Chemical Industries Ltd. under the trade name of Novatec ET002) and the lamination was press molded at a temperature of 220° C. and under a pressure of 15 kg./cm.$^2$ for 30 minutes.

The peel-off strength of the resulted composite body was 6.5 kg./cm. and the bonding strength was not changed after 50 times of cyclic temperature variation between —70° C. and 100° C.

EXAMPLE 7

A corrosion proof aluminum sheet of 0.5 mm. thick (sold by Mitsubishi Reynolds Aluminum Company under the trade name of 5052-34H) was degreased with 10% aqueous solution of sodium hydroxide and 5-10% aqueous solution of nitric acid.

A commercial vinyl acetate-maleic acid anhydride copolymer (copolymerization ratio 1:1, molecular weight 60,000) was incorporated into ethyl alcohol and the mixture was heated to the boiling temperature of ethyl alcohol until the copolymer dissolved thus effecting half esterification.

The resulted ethyl alcohol solution of the half-esterified compound of the copolymer was further diluted with ethyl alcohol to obtain a 1% solution and the solution was applied to predetermined portions of said surface treated aluminum sheet by dipping and the aluminum sheet was then air dried.

A high density polyethylene sheet (sold by Mitsubishi Chemical Industries Ltd. under the trade name of Novatec ET002 and having a melt index of 4.2) was piled upon predetermined portions of the coated aluminum sheet and the lamination was press molded at a temperature of 200° C. and under a pressure of 15 kg./cm.$^2$ for 30 minutes. The 180° peel-off strength of the resulted composite body was 13.0 kg./cm.

EXAMPLE 8

The surface of a sheet of corrosion proof aluminum (sold by Mitsubishi Reynolds Aluminum Company under the trade name of 5052-34H) was oxidized by anodic treatment and half ethyl ester of a vinyl acetate-maleic acid copolymer prepared in the same manner as in Example 7 was sprayed onto predetermined portions of the treated aluminum sheet, and the sheet was then dried. Then a high density polyethylene sheet (sold by Mitsubishi Chemical Industries Ltd. under the trade name of Novatec BT002 and having a melt index of 0.2) was piled upon predetermined portions of said treated aluminum sheet and the lamination was press molded at a temperature of 200° C. and under a pressure of 15 kg./cm.$^2$ for 30 minutes.

The 180° peel-off strength of the resulted composite body was more than 18.5 kg./cm.

EXAMPLE 9

A stainless steel sheet degreased with 10% aqueous solution of sodium hydroxide and 5-10% aqueous solution of nitric acid in the same manner as in Example 3 was further surface treated with 5% aqueous solution of chromic acid.

According to the same process as described in Example 7, 1% ethyl alcohol solution of half ethyl ester of a vinyl acetate-maleic acid anhydride copolymer was prepared and the solution was applied by dipping to predetermined portions of said surface treated stainless steel sheet, and then the sheet was air dried.

Then a high density polyethylene sheet (sold by Mitsubishi Chemical Industries Ltd. under the trade name of Novatec ET002 and having a melt index of 0.2) was piled upon predetermined portions of the coated stainless steel sheet and the lamination was press molded at a temperature of 200° C. and under a pressure of 15 kg./cm.$^2$ for 30 minutes. The 180° peel-off strength of the resulted composite body was 10 kg./cm.

EXAMPLE 10

The process of Example 9 was repeated except that the surface of the stainless sheet was treated with 5% aqueous solution of chromic acid and 2.5% aqueous solution of sulfuric acid. The resulted composite body showed a 180° peel-off strength of 12.5 kg./cm.

EXAMPLE 11

The process of Example 5 was repeated except that binders as shown in Table 2 were used. For comparison, Table 2 also includes the results of composite bodies utilizing bonding agents available on the market.

TABLE 2

| Binder | 180° peel-off strength,[1] kg./cm. | Cyclic temp. variation, −60° C. to 100° C. | Temperature dependency | Water proofness |
|---|---|---|---|---|
| Ethyl half-ester of vinyl acetate-maleic acid copolymer | 16.5 | Good | Small | Good. |
| Butyl half-ester of vinyl acetate-maleic acid copolymer | 15.0 | do | do | Do. |
| Half ethyl ester of styrene-maleic acid copolymer | 6.5 | do | do | Do. |
| Commercial binder [2] | <1 | Bad | Large | Bad. |
| Do.[3] | <1 | Bad | do | Bad. |

[1] 180° peel-off strength was measured by pulling the sheet at an angle of 180°, at a peel-off speed of 100 mm./min., at a temperature of 20° C. and at a relative humidity of 50%.
[2] A binder of the polyethylene series.
[3] A binder consisting of a synthetic rubber solution.

What is claimed is:

1. A method of manufacturing a laminated body of a metal selected from the group consisting of aluminum, alloys thereof and stainless steel and a polyolefin which comprises:
   (a) applying a binder to the interface between said metal and said polyolefin, the main component of said binder being selected from the group consisting of maleic acid-vinyl acetate copolymers, acrylic acid-vinyl acetate copolymers, esterified maleic acid-vinyl acetate copolymers and esterified maleic acid-styrene copolymers, to form a composite;
   (b) laminating said composite under pressure and at a temperature higher than the melting point of said polyolefin to effect bonding.

2. A method according to claim 1 wherein the pressure is higher than 1 kg./cm.$^2$ and the temperature is between 165° and 250° C.

3. A method according to claim 2 wherein the pressure is above 5 kg./cm.$^2$ and the temperature is between 180° and 220° C.

4. A method according to claim 1 wherein the metal surface is treated with aqueous chromic acid and is then washed with water prior to contact with the binder.

5. A method according to claim 1 wherein the metal is subjected to anodic oxidation prior to contact with the binder.

6. A method according to claim 1 wherein the binder is applied as a solution.

7. A method according to claim 1 wherein the binder is selected from the group consisting of half esters of maleic acid-vinyl acetate copolymers and maleic acid-styrene copolymers.

8. A method according to claim 7 wherein the half ester is an ester of an aliphatic alcohol having 1 to 8 carbon atoms.

9. A method according to claim 8 wherein the alcohol is selected from the group consisting of methyl ethyl, butyl and octyl alcohols.

10. A method according to claim 7 wherein said binder is applied to said metal as a solution in an organic solvent.

11. A method according to claim 1 wherein the polyolefin is selected from the group consisting of polyethylene, polypropylene and polybutene.

12. A method according to claim 11 wherein the pressure is greater than 5 kg./cm.$^2$, the temperature is between 180 and 220° C. and the binder comprises as its main component the half esters of maleic acid-vinyl acetate copolymers or maleic acid-styrene copolymers with aliphatic alcohols having one to 8 carbon atoms.

13. A method according to claim 1 wherein the metal is degreased prior to contact with the binder.

References Cited

UNITED STATES PATENTS

| | | | |
|---|---|---|---|
| 3,227,694 | 1/1966 | Masters | 156—332 |
| 3,468,753 | 9/1969 | Vincent et al. | 156—334 |
| 3,497,550 | 2/1970 | Samour | 156—332 |
| 3,509,111 | 4/1970 | Samour | 156—332 |
| 3,515,630 | 6/1970 | Columbus et al. | 156—332 |

BENJAMIN R. PADGETT, Primary Examiner

S. J. LECHERT, Jr., Assistant Examiner

U.S. Cl. X.R.

156—319, 327, 332